United States Patent
Kim et al.

(10) Patent No.: US 10,693,681 B2
(45) Date of Patent: *Jun. 23, 2020

(54) OFDM TRANSMISSION/RECEPTION DEVICE FOR TRANSMITTING AND RECEIVING OFDM SYMBOLS HAVING A VARIABLE DATA TRANSMISSION RATE AND METHOD THEREOF

(71) Applicant: SAMSUNG ELECTRONICS CO., LTD., Suwon-si (KR)

(72) Inventors: Ki-bo Kim, Hwaseong-si (KR); June-hee Lee, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/259,552

(22) Filed: Jan. 28, 2019

(65) Prior Publication Data

US 2019/0158316 A1 May 23, 2019

Related U.S. Application Data

(63) Continuation of application No. 15/911,951, filed on Mar. 5, 2018, now Pat. No. 10,218,541, which is a
(Continued)

(30) Foreign Application Priority Data

May 28, 2007 (KR) .................. 10-2007-0051724

(51) Int. Cl.
*H04L 5/00* (2006.01)
*H04L 25/02* (2006.01)

(52) U.S. Cl.
CPC .......... *H04L 25/02* (2013.01); *H04L 5/0007* (2013.01); *H04L 5/0048* (2013.01); *H04L 5/0058* (2013.01)

(58) Field of Classification Search
CPC ...... H04L 25/02; H04L 5/0058; H04L 5/0048; H04L 5/0007
See application file for complete search history.

(56) References Cited

U.S. PATENT DOCUMENTS 6,654,429 B1 * 11/2003 Li ........................ H04L 1/06
370/252
7,688,909 B2 3/2010 Tsutsui
(Continued)

FOREIGN PATENT DOCUMENTS

| CN | 1490951 A | 4/2004 |
| CN | 1585392 A | 2/2005 |

(Continued)

OTHER PUBLICATIONS

Communication dated Mar. 27, 2015, issued by the State Intellectual Property Office of P.R. China in application No. 201310058771.1.
(Continued)

*Primary Examiner* — Luat Phung
(74) *Attorney, Agent, or Firm* — Sughrue Mion, PLLC

(57) ABSTRACT

An orthogonal frequency division multiplexing (OFDM) transmission device transmits OFDM symbols to at least one reception device and includes an OFDM transmission processing unit which generates a plurality of OFDM symbols; a pilot insertion unit which inserts pilot tones into each of the plurality of OFDM symbols; and a control unit which controls the pilot insertion unit to insert the pilot tones according to a pilot insertion pattern which is selected to correspond to a communication environment from among a plurality of pilot insertion patterns.

4 Claims, 5 Drawing Sheets

Related U.S. Application Data continuation of application No. 13/780,814, filed on Feb. 28, 2013, now Pat. No. 9,912,496, which is a continuation of application No. 12/601,857, filed as application No. PCT/KR2008/002473 on Apr. 30, 2008, now Pat. No. 8,848,506.

(56) References Cited

U.S. PATENT DOCUMENTS

| | | | |
|---|---|---|---|
| 8,848,506 B2 | 9/2014 | Kim et al. | |
| 2003/0123407 A1 | 7/2003 | Arimitsu | |
| 2006/0050676 A1* | 3/2006 | Mansour | H04B 1/707 370/342 |
| 2006/0172704 A1* | 8/2006 | Nishio | H04L 5/0007 455/67.11 |
| 2006/0209670 A1* | 9/2006 | Gorokhov | H04L 5/0007 370/208 |
| 2006/0209732 A1* | 9/2006 | Gorokhov | H04B 1/715 370/310 |
| 2007/0009016 A1 | 1/2007 | Tsutsui | |
| 2007/0066273 A1 | 3/2007 | Loroia et al. | |
| 2007/0066329 A1 | 3/2007 | Laroia et al. | |
| 2007/0195899 A1* | 8/2007 | Bhushan | H04B 7/0452 375/260 |
| 2007/0253324 A1 | 11/2007 | Ma et al. | |
| 2008/0219144 A1* | 9/2008 | Brehler | H04L 5/0048 370/203 |
| 2008/0299984 A1 | 12/2008 | Shimomura et al. | |
| 2010/0290545 A1 | 11/2010 | Kim et al. | |
| 2013/0177100 A1 | 7/2013 | Kim et al. | |

FOREIGN PATENT DOCUMENTS

| | | |
|---|---|---|
| CN | 1833387 A | 9/2006 |
| CN | 1852069 A | 10/2006 |
| CN | 1893309 A | 1/2007 |
| CN | 101663871 B | 4/2013 |
| EP | 1 542 488 A1 | 12/2003 |
| EP | 1 643 669 A1 | 8/2004 |
| JP | 11-284597 A | 10/1999 |
| KR | 10-2004-0035291 A | 4/2004 |
| WO | 2004/100577 A1 | 11/2004 |

OTHER PUBLICATIONS

Communication dated Jan. 19, 2018 from the European Patent Office in counterpart application No. 08753273.5.
Communication dated Apr. 23, 2015, issued by the State Intellectual Property Office of P.R China in application No. 201310059070.X.
Communication dated Mar. 28, 2014 issued by the European Patent Office in counterpart European Patent Application No. 08 75 3273.
Communication dated Dec. 3, 2015 by the State Intellectual Property Office of PR China in related Application No. 201310059070.X.
Communication dated Apr. 17, 2014 issued by the European Patent Office in counterpart European Patent Application No. 08 753 273.5.
Communication dated Dec. 31, 2014 by the National Office of Intellectual Property in corr. application 10200902652.
Communication dated Dec. 4, 2014, by the European Patent Office in corr. application 08753273.
Communication dated Mar. 15, 2019, issued by the European Patent Office in counterpart European Application No. 08 753 273.5.

* cited by examiner

[Fig. 1]
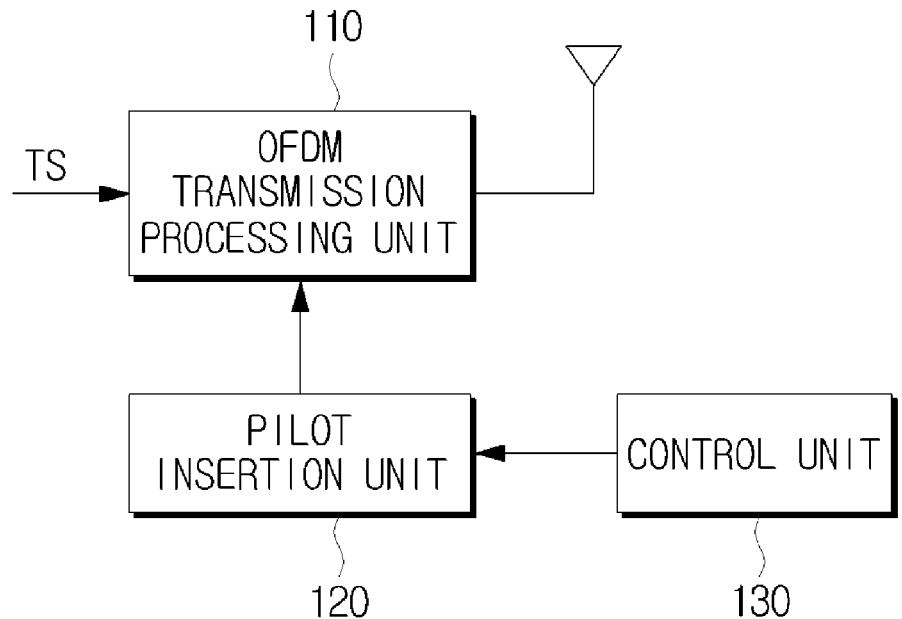
[Fig. 2]
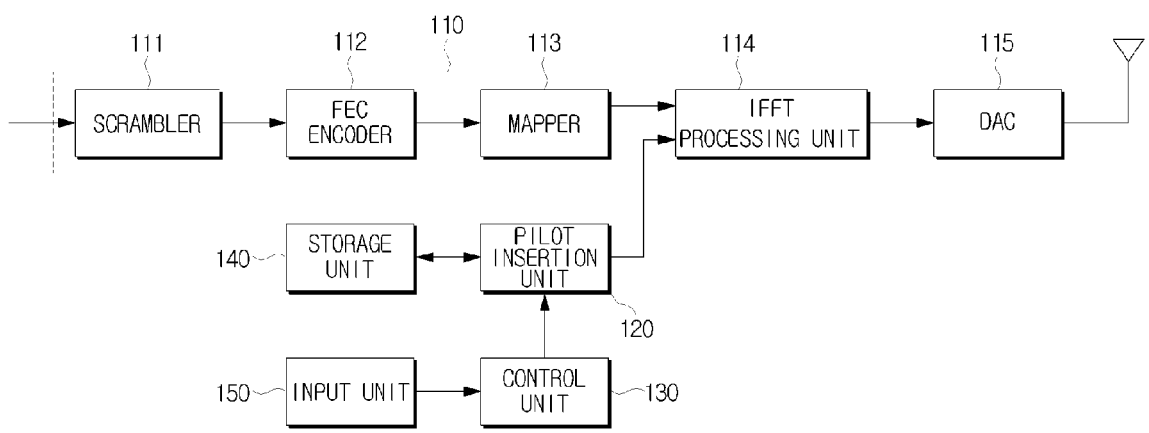

[Fig. 3]
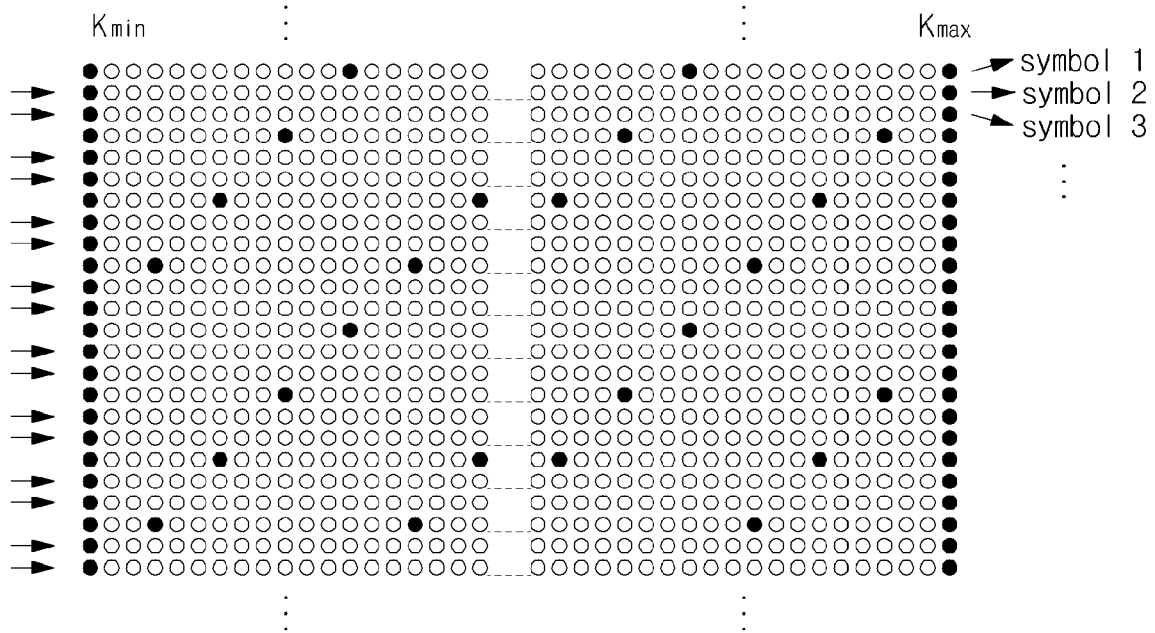
[Fig. 4]
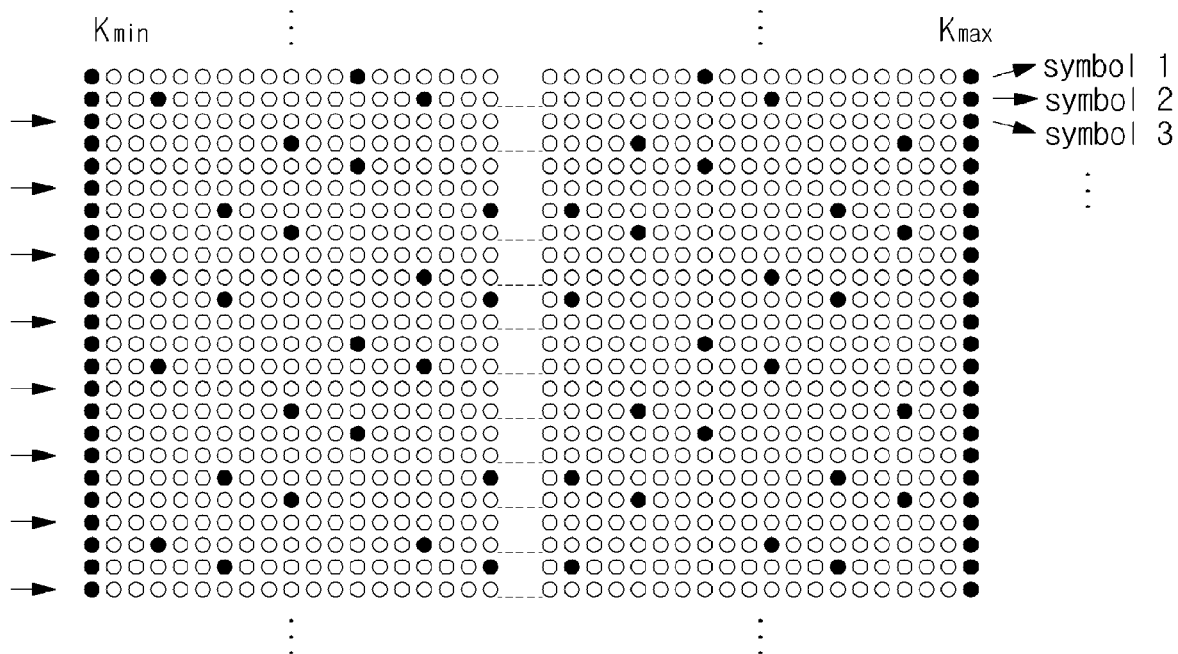

[Fig. 5]
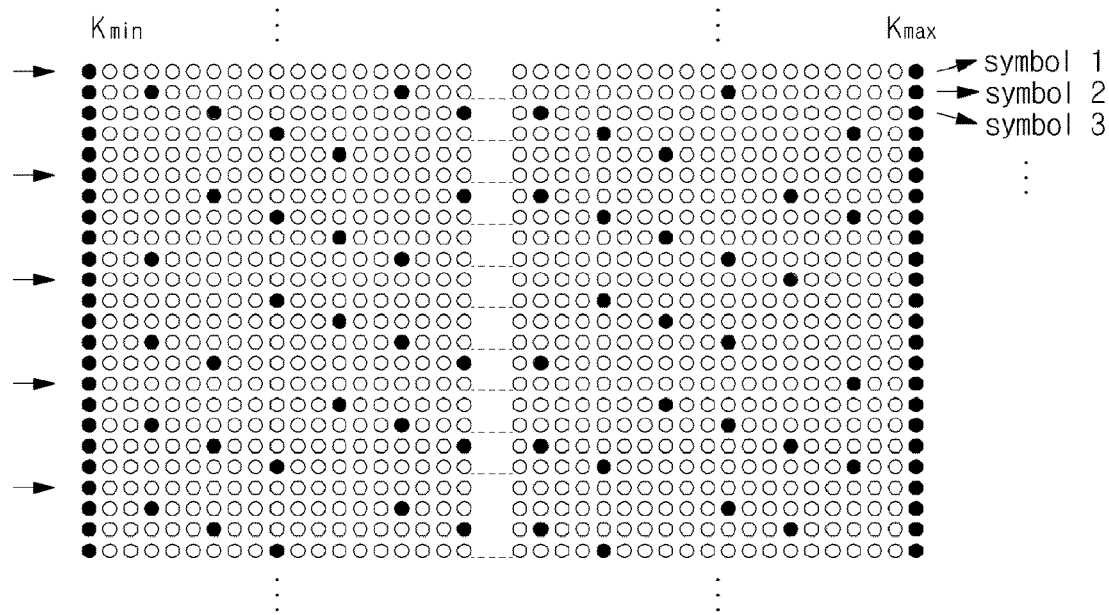
[Fig. 6]
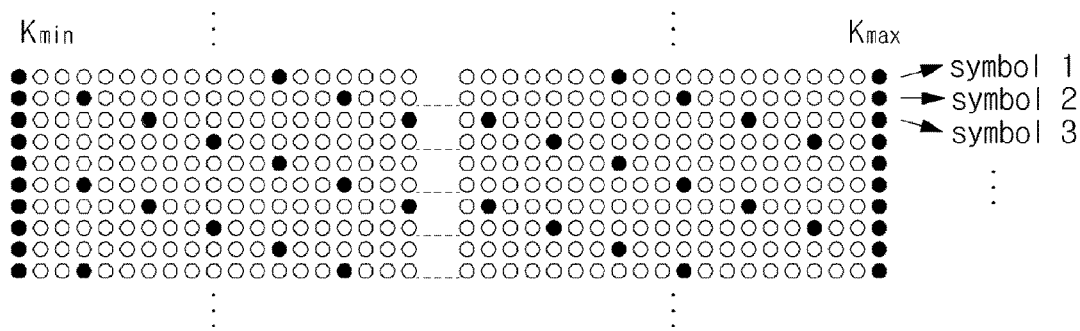
[Fig. 7]
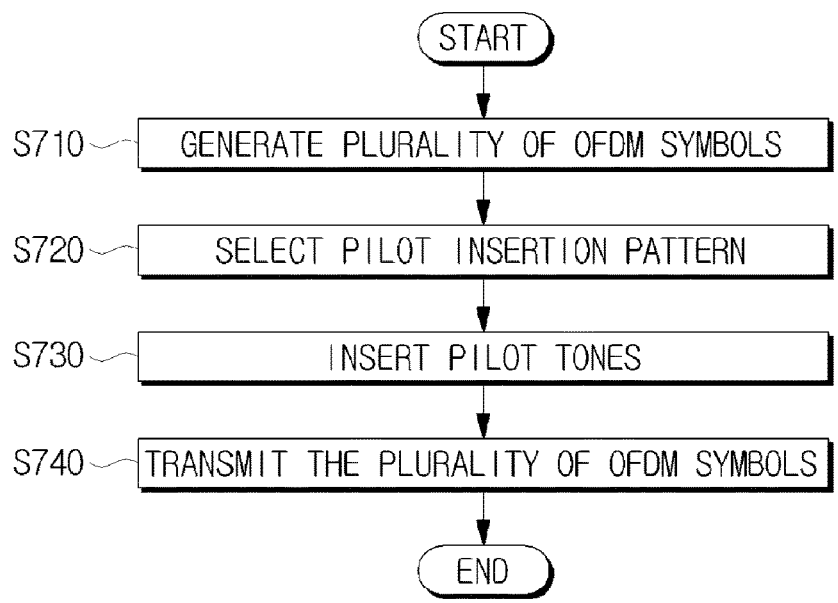

[Fig. 8]
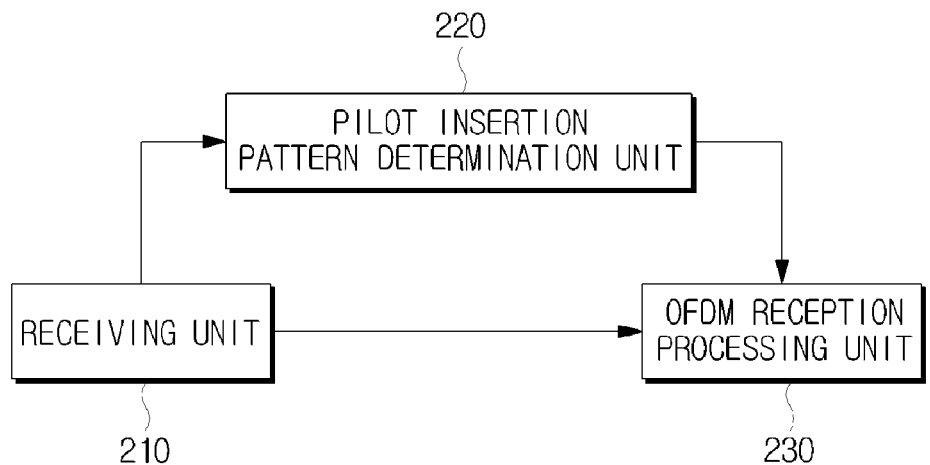
[Fig. 9]
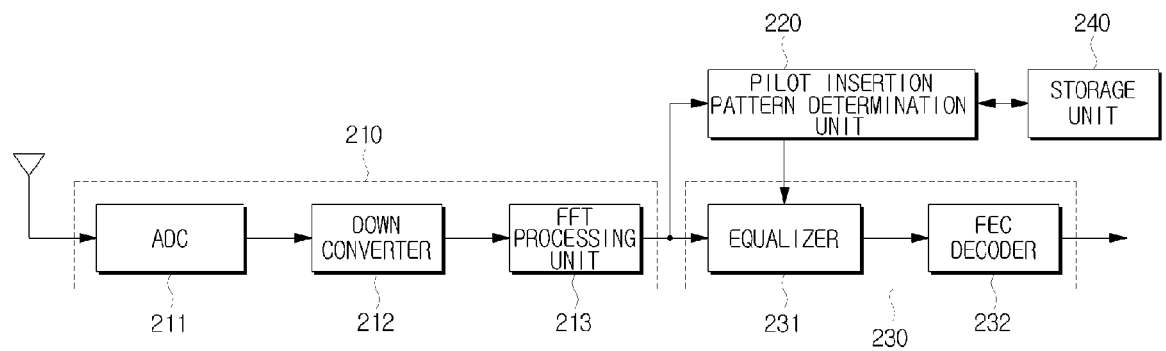
[Fig. 10]
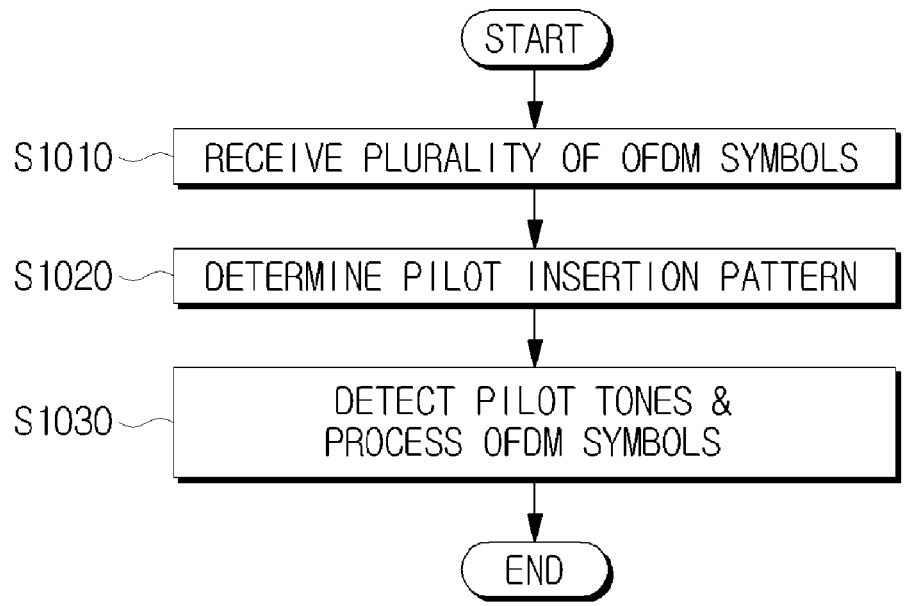

[Fig. 11]
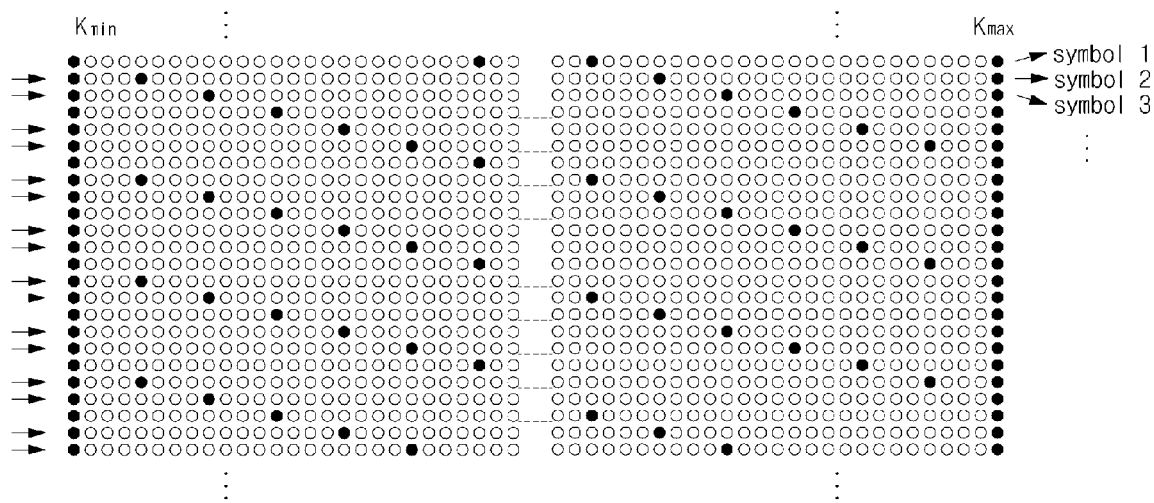
[Fig. 12]
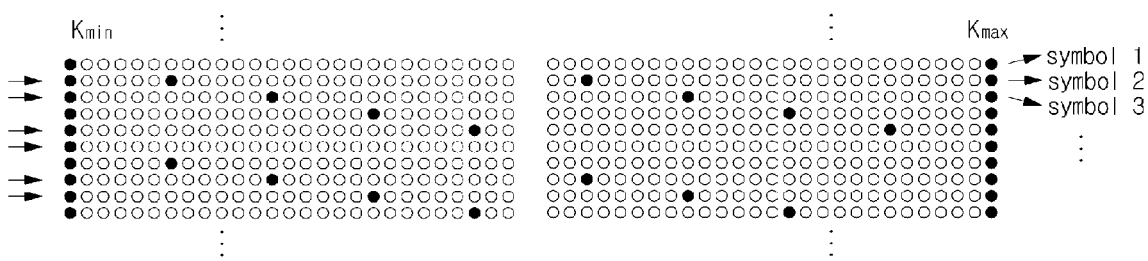

OFDM TRANSMISSION/RECEPTION DEVICE FOR TRANSMITTING AND RECEIVING OFDM SYMBOLS HAVING A VARIABLE DATA TRANSMISSION RATE AND METHOD THEREOF

This application is a Continuation Application of U.S. application Ser. No. 15/911,951, which was filed Mar. 5, 2018, which is a Continuation Application of U.S. application Ser. No. 13/780,814, which was filed Feb. 28, 2013, now U.S. Pat. No. 9,912,496, issued Mar. 6, 2018, which is a Divisional Application of U.S. application Ser. No. 12/601,857, which was filed on Nov. 25, 2009, now U.S. Pat. No. 8,848,506, issued Sep. 30, 2014, and is a National Stage of International Application No. PCT/KR2008/002473 filed Apr. 30, 2008 and claims priority Korean Patent Application No. 10-2007-0051724 filed on May 28, 2007, in the Korean Intellectual Property Office, the disclosures of which are incorporated herein in their entireties by reference.

BACKGROUND OF THE INVENTION

1. Field of the Invention

The present invention relates to orthogonal frequency division multiplexing (OFDM) transmission and reception devices and methods thereof. More particularly, the present invention relates to OFDM transmission and reception devices which transmit and receive OFDM symbols having a variable data transmission rate, and to methods thereof.

2. Description of the Related Art

With the development of electronic and communication technologies, digital technologies have been introduced into the field of broadcasting systems, and diverse standards for digital broadcasting have been published. Specific examples of such standards are the U.S.-oriented Advanced Television Systems Committee Vestigial Sideband (ATSC VSB) standard and the European-oriented Digital Video Broadcasting-Terrestrial (DVB-T) standard. These two standards differ from each other in many ways, such as the manner of audio compression and the channel bands employed. In particular, ATSC VSB standards employ single carrier schemes, but DVB-T standards employ multiple carrier schemes.

The multiple carrier schemes employed in DVB-T standards is an orthogonal frequency division multiplexing (OFDM) scheme. OFDM schemes are utilized as standards for IEEE 802.11a, ETSI BRAN'S HIPERLAN 2, European digital audio broadcasting (DAB) and digital TV DVB-T. A conventional single carrier transmission scheme in which information is carried by a single carrier causes interference between symbols to increase, so distortion also increases. Accordingly, an equalizer of a receiver must be complicated. In order to solve these problems of the conventional single carrier transmission scheme, OFDM schemes have been introduced.

OFDM schemes enable data to be transmitted using multi-carriers. Such OFDM schemes are able to convert data symbols input in series into parallel data symbols, to modulate each of the parallel symbols into a plurality of tone signals which are orthogonal to each other, and to transmit the modulated signals.

OFDM schemes have been widely applied to digital transmission technologies, such as Digital Audio Broadcasting (DAB), digital television, Wireless Local Area Network (WLAN) or Wireless Asynchronous Transfer Mode (WATM). In particular, OFDM schemes maintain orthogonality between tone signals, unlike conventional multi-carrier schemes, so it is possible to obtain optimum transmission efficiency during high speed data transmission. Additionally, almost the entire available frequency band can be utilized and multi-path fading can be reduced.

In a DVB-T system, pilot tones are inserted into OFDM symbols, and the OFDM symbols into which the pilot tones are inserted are transmitted to a reception device, so that the reception device may perform channel equalization and estimation. The number of pilot tones to be used may be determined according to the type of standard. For example, 142 pilot tones may be used in a 2K Fast Fourier Transform (FFT) transmission mode, and 568 pilot tones may be used in an 8K FFT transmission mode. The capacity of pilot tones corresponds to approximately 8.3% of the total data transmission capacity.

The reception device checks the pilot tones inserted into the OFDM symbols, to analyze the noise of channels, so as to perform channel equalization. The pilot tones are inserted into the OFDM symbols according to regular pilot insertion patterns, which are shared between the reception device and transmission device.

A conventional DVB-T system has the advantage that it is able to receive signals while moving, because channel estimation information is rapidly updated by frequent insertion of pilot tones in a time shaft. However, excess pilot insertion causes a reduction in the capacity of data to be actually transmitted.

If a reception device is fixed in place so that it hardly moves, there are not many changes in the time characteristics of channels formed between the reception device and transmission device.

However, even in this situation, pilot tones are inserted into OFDM symbols in the conventional DVB-T system without changing the pilot insertion pattern, so the data transmission rate is reduced unnecessarily.

SUMMARY OF THE INVENTION

The present invention provides orthogonal frequency division multiplexing (OFDM) transmission and reception devices which are able to transceive OFDM symbols having a variable data transmission rate in order to efficiently transmit data, and methods thereof.

The present invention also provides orthogonal frequency division multiplexing (OFDM) transmission and reception devices which are able to transceive data by variably adjusting the data transmission rate while utilizing an original system used as an OFDM transceiver, and methods thereof.

According to an aspect of the present invention, there is provided an orthogonal frequency division multiplexing (OFDM) transmission device which transmits OFDM symbols to at least one reception device, the OFDM transmission device including an OFDM transmission processing unit which generates a plurality of OFDM symbols; a pilot insertion unit which inserts pilot tones into each of the plurality of OFDM symbols; and a control unit which controls the pilot insertion unit to insert the pilot tones according to a pilot insertion pattern which is selected to correspond to a communication environment from among a plurality of pilot insertion patterns.

The control unit may control the pilot insertion unit to insert the pilot tones into only some of the plurality of OFDM symbols, if a static communication environment is established in which the at least one reception device receives the plurality of OFDM symbols while being fixed in place.

The control unit may control the pilot insertion unit to insert the pilot tones into each of the plurality of OFDM symbols, if a dynamic communication environment is established in which the at least one reception device receives the plurality of OFDM symbols while moving.

The control unit may select one from among a first pilot insertion pattern in which pilot tones are inserted into only one OFDM symbol among every three OFDM symbols, a second pilot insertion pattern in which pilot tones are inserted into only two OFDM symbols among every three OFDM symbols, a third pilot insertion pattern in which pilot tones are inserted into four OFDM symbols among every five OFDM symbols, and a fourth pilot insertion pattern in which pilot tones are inserted into all of the plurality of OFDM symbols, and may control the pilot insertion unit to insert the pilot tones into the plurality of OFDM symbols according to the selected pilot insertion pattern.

The OFDM transmission device may further include a storage unit which stores information regarding the first to fourth pilot insertion patterns; and an input unit which inputs information regarding the communication environment. The control unit may select a pilot insertion pattern corresponding to the information regarding the communication environment received from the input unit, and the pilot insertion unit may read information regarding the selected pilot insertion pattern from the storage unit and insert the pilot tones based on the read information.

The pilot insertion unit may insert each pilot tone into a single OFDM symbol every twelfth tone so that the pilot tone on the OFDM symbol may be spaced apart from a pilot tone on a previous OFDM symbol by three tones.

The control unit may control the pilot insertion unit to insert each pilot tone in each preset pilot insertion position on only some of the plurality of OFDM symbols according to the type of communication environment.

The pilot insertion unit may insert each pilot tone into a single OFDM symbol every n-th tone so that the pilot tone on the OFDM symbol may be spaced apart from a pilot tone on a previous OFDM symbol by m tones. Here, n and m may be natural numbers.

The control unit may change the pilot insertion pattern by adjusting at least one of n and m according to the type of communication environment.

The control unit may control the pilot insertion unit to insert each pilot tone in each preset pilot insertion position on only some of the plurality of OFDM symbols according to the type of communication environment, if n and m are fixed values.

The control unit may notify the at least one reception device of the information regarding the selected pilot insertion pattern via data tones in at least one OFDM symbol among the plurality of OFDM symbols.

According to another aspect of the present invention, there is provided an orthogonal frequency division multiplexing (OFDM) transmission method which transmits OFDM symbols to at least one reception device, the OFDM transmission method including generating a plurality of OFDM symbols; selecting one pilot insertion pattern from among a plurality of pilot insertion patterns according to the type of communication environment with the at least one reception device; inserting pilot tones into each of the plurality of OFDM symbols according to the selected pilot insertion pattern; and transmitting the plurality of OFDM symbols to the at least one reception device.

The selecting may include selecting a pilot insertion pattern in which pilot tones are inserted into only some of the plurality of OFDM symbols, if a static communication environment is established in which the at least one reception device receives the plurality of OFDM symbols while being fixed in place.

The selecting may include selecting a pilot insertion pattern in which pilot tones are inserted into each of the plurality of OFDM symbols, if a dynamic communication environment is established in which the at least one reception device receives the plurality of OFDM symbols while moving.

The selecting may include selecting one from among a first pilot insertion pattern in which pilot tones are inserted into only one OFDM symbol among every three OFDM symbols, a second pilot insertion pattern in which pilot tones are inserted into only two OFDM symbols among every three OFDM symbols, a third pilot insertion pattern in which pilot tones are inserted into four OFDM symbols among every five OFDM symbols, and a fourth pilot insertion pattern in which pilot tones are inserted into all of the plurality of OFDM symbols, according to the type of communication environment.

The inserting may include inserting each pilot tone into a single OFDM symbol every twelfth tone so that the pilot tone on the OFDM symbol may be spaced apart from a pilot tone on a previous OFDM symbol by three tones.

The inserting may include inserting each pilot tone in each preset pilot insertion position on only some of the plurality of OFDM symbols according to the type of communication environment.

The inserting may include inserting each pilot tone into a single OFDM symbol every n-th tone so that the pilot tone on the OFDM symbol may be spaced apart from a pilot tone on a previous OFDM symbol by m tones. Here, n and m may be natural numbers.

The selecting may include selecting one from among the plurality of pilot insertion patterns by adjusting at least one of n and m according to the type of communication environment.

The selecting may include selecting a pilot insertion pattern in which each pilot tone is inserted in each preset pilot insertion position on only some of the plurality of OFDM symbols according to the type of communication environment, if n and m are fixed values.

The OFDM transmission method may further include notifying the at least one reception device of information regarding the selected pilot insertion pattern via data tones in at least one OFDM symbol among the plurality of OFDM symbols.

According to another aspect of the present invention, there is provided an orthogonal frequency division multiplexing (OFDM) reception device, the OFDM reception device including a receiving unit which receives a plurality of OFDM symbols, of which the data transmission rate varies according to changes in pilot insertion patterns; a pilot insertion pattern determination unit which detects pilot insertion pattern information contained in the plurality of OFDM symbols, and determines which pilot insertion pattern is used in the plurality of OFDM symbols using the detected information; and an OFDM reception processing unit which detects pilot tones from the plurality of OFDM symbols based on the determined pilot insertion pattern, and processes the plurality of OFDM symbols.

The OFDM reception device may further include a storage unit which stores pilot insertion pattern information which is shared with an OFDM transmission device. In this situation, the pilot insertion pattern determination unit may read the pilot insertion pattern information from the storage unit.

The reception unit may receive a plurality of OFDM symbols, only some of which contain pilot tones, if a static communication environment is established in which the OFDM reception device receives the plurality of OFDM symbols while being fixed in place. The reception unit may receive a plurality of OFDM symbols, each of which contains pilot tones, if a dynamic communication environment is established in which the OFDM reception device receives the plurality of OFDM symbols while moving.

The pilot tones may be inserted into the plurality of OFDM symbols according to one selected from among a first pilot insertion pattern in which pilot tones are inserted into only one OFDM symbol among every three OFDM symbols, a second pilot insertion pattern in which pilot tones are inserted into only two OFDM symbols among every three OFDM symbols, a third pilot insertion pattern in which pilot tones are inserted into four OFDM symbols among every five OFDM symbols, and a fourth pilot insertion pattern in which pilot tones are inserted into each of the plurality of OFDM symbols.

Each pilot insertion position may be set by inserting each pilot tone into a single OFDM symbol every twelfth tone so that the pilot tone on the OFDM symbol may be spaced apart from a pilot tone on a previous OFDM symbol by three tones. If pilot insertion is skipped with respect to only some of the plurality of OFDM symbols according to the type of communication environment, each pilot tone may be inserted in the set pilot insertion position on the remainder of the plurality of OFDM symbols.

Each pilot insertion position may be set by inserting each pilot tone into a single OFDM symbol every n-th tone so that the pilot tone on the OFDM symbol may be spaced apart from a pilot tone on a previous OFDM symbol by m tones. Here, n and m may be natural numbers. If pilot insertion is skipped with respect to only some of the plurality of OFDM symbols according to the type of communication environment, each pilot tone may be inserted in the set pilot insertion position on the remainder of the plurality of OFDM symbols.

Each pilot insertion position may be set by inserting each pilot tone into a single OFDM symbol every n-th tone so that the pilot tone on the OFDM symbol may be spaced apart from a pilot tone on a previous OFDM symbol by m tones. Here, n and m may be natural numbers. Pilot tones may be inserted according to a pilot insertion pattern in which at least one of n and m is adjusted corresponding to the type of communication environment.

According to another aspect of the present invention, there is provided an orthogonal frequency division multiplexing (OFDM) reception method in an OFDM reception device, the OFDM reception method including receiving a plurality of OFDM symbols, of which the data transmission rate varies according to changes in pilot insertion patterns; detecting pilot insertion pattern information contained in the plurality of OFDM symbols, and determining which pilot insertion pattern is used in the plurality of OFDM symbols using the detected information; and detecting pilot tones from the plurality of OFDM symbols based on the determined pilot insertion pattern, and processing the plurality of OFDM symbols.

The detecting and processing may include reading pilot insertion pattern information which is previously stored and are shared with an OFDM transmission device.

The receiving may include receiving a plurality of OFDM symbols, only some of which contain pilot tones, if a static communication environment is established in which the OFDM reception device receives the plurality of OFDM symbols while being fixed in place; and receiving a plurality of OFDM symbols, each of which contains pilot tones, if a dynamic communication environment is established in which the OFDM reception device receives the plurality of OFDM symbols while moving.

The pilot tones may be inserted into the plurality of OFDM symbols according to one selected from among a first pilot insertion pattern in which pilot tones are inserted into only one OFDM symbol among every three OFDM symbols, a second pilot insertion pattern in which pilot tones are inserted into only two OFDM symbols among every three OFDM symbols, a third pilot insertion pattern in which pilot tones are inserted into four OFDM symbols among every five OFDM symbols, and a fourth pilot insertion pattern in which pilot tones are inserted into all of the plurality of OFDM symbols.

Each pilot insertion position may be set by inserting each pilot tone into a single OFDM symbol every twelfth tone so that the pilot tone on the OFDM symbol may be spaced apart from a pilot tone on a previous OFDM symbol by three tones. If pilot insertion is skipped with respect to only some of the plurality of OFDM symbols according to the type of communication environment, each pilot tone may be inserted in the set pilot insertion position on the remainder of the plurality of OFDM symbols.

Each pilot insertion position may be set by inserting each pilot tone into a single OFDM symbol every n-th tone so that the pilot tone on the OFDM symbol may be spaced apart from a pilot tone on a previous OFDM symbol by m tones. Here, n and m may be natural numbers. If pilot insertion is skipped with respect to only some of the plurality of OFDM symbols according to the type of communication environment, each pilot tone may be inserted in the set pilot insertion position on the remainder of the plurality of OFDM symbols.

Each pilot insertion position may be set by inserting each pilot tone into a single OFDM symbol every n-th tone so that the pilot tone on the OFDM symbol may be spaced apart from a pilot tone on a previous OFDM symbol by m tones. Here, n and m may be natural numbers. Pilot tones may be inserted according to a pilot insertion pattern in which at least one of n and m is adjusted corresponding to the type of communication environment.

As described above, according to the present invention, a pilot insertion pattern is adaptively selected according to the type of communication environment, so it is possible to variably adjust the data transmission rate. Accordingly, the number of times unnecessary pilot tones are transmitted may be reduced, and it is thus possible to transceive data more efficiently.

Additionally, it is possible to adjust a pilot insertion period and a distance between pilot insertion positions of each OFDM symbol. Accordingly, if the pilot insertion period and distance are set according to a conventional standard, a system according to the present invention may be desired in the same manner as a conventional system employing the conventional standard, so it is possible to increase the data transmission rate while utilizing the conventional system. In other words, the OFDM transmission and reception devices have compatibility with conventional OFDM transmission and reception devices.

BRIEF DESCRIPTION OF THE DRAWINGS

The above and other aspects and advantages of the present invention will become more apparent by describing in detail exemplary embodiments thereof with reference to the attached drawings in which:

FIG. 1 is a block diagram showing an orthogonal frequency division multiplexing (OFDM) transmission device according to an exemplary embodiment of the present invention;

FIG. 2 is a detailed block diagram showing the OFDM transmission device of FIG. 1;

FIGS. 3 to 6 illustrate examples of various pilot insertion patterns in which pilot tones are inserted into OFDM symbols transmitted by the OFDM transmission device of FIG. 1;

FIG. 7 is a flowchart explaining an OFDM transmission method according to an exemplary embodiment of the present invention;

FIG. 8 is a block diagram showing an OFDM reception device according to an exemplary embodiment of the present invention;

FIG. 9 is a detailed block diagram showing the OFDM reception device of FIG. 8;

FIG. 10 is a flowchart explaining an OFDM reception method according to an exemplary embodiment of the present invention; and FIGS. 11 and 12 illustrate examples of various pilot insertion patterns which are applicable to OFDM symbols transceived between the OFDM transmission device and the OFDM reception device.

DETAILED DESCRIPTION OF THE EXEMPLARY EMBODIMENTS

Hereinafter, exemplary embodiments of the present invention will be described in detail with reference to the accompanying drawings.

FIG. 1 is a block diagram showing an orthogonal frequency division multiplexing (OFDM) transmission device according to an exemplary embodiment of the present invention. The OFDM transmission device of FIG. 1 includes an OFDM transmission processing unit 110, a pilot insertion unit 120 and a control unit 130.

The OFDM transmission processing unit 110 generates a plurality of OFDM symbols to be transmitted to an OFDM reception device (not shown). In more detail, if transport streams (TS) are received from a broadcasting apparatus, the OFDM transmission processing unit 110 modulates the received TS on a plurality of sub-carriers, to generate a plurality of OFDM symbols. The configuration of the OFDM transmission processing unit 110 will be described in detail later.

The control unit 130 selects a pilot insertion pattern according to the communication environment between the OFDM transmission device and an OFDM reception device. Specifically, the control unit 130 may select one pilot insertion pattern corresponding to the current communication environment from among a plurality of pilot insertion patterns that have been previously set between the OFDM transmission device and OFDM reception device. For example, if a dynamic communication environment is established, that is, if an OFDM reception device receives a broadcast while moving, the control unit 130 may select a pilot insertion pattern in which a large number of pilot tones are used. Alternatively, if a static communication environment is established, that is, if an OFDM reception device that is unable to move receives a broadcast, the control unit 130 may select a pilot insertion pattern in which a small number of pilot tones are used.

The type of communication environment may be determined by taking into consideration the characteristics of a system to which an OFDM transmission mode is applied. For example, in the case of a system to transmit High-Definition (HD) grade broadcasting data, HD grade broadcasting data has a larger capacity than Standard-Definition (SD) grade broadcasting data, and thus requires an increase in the data transmission rate. Accordingly, a pilot insertion pattern in which a relatively small number of pilot tones is used may be selected, such as a static communication environment.

The pilot insertion unit 120 inserts pilot tones into the plurality of OFDM symbols generated by the OFDM transmission processing unit 110. Here, the pilot insertion unit 120 may insert each pilot tone into positions of the OFDM symbols set according to the pilot insertion pattern selected by the control unit 130. A pilot insertion process has been published in the DVB-T standard, so detailed description thereof is omitted.

FIG. 2 is a detailed block diagram showing the OFDM transmission device of FIG. 1. The OFDM transmission device further includes a storage unit 140 and an input unit 150, in addition to the OFDM transmission processing unit 110, pilot insertion unit 120 and control unit 130.

The OFDM transmission processing unit 110 generates a plurality of OFDM symbols and transmits the generated OFDM symbols to a reception device via an antenna. The OFDM transmission processing unit 110 includes a scrambler 111, a Forward Error Correction (FEC) encoder 112, a mapper 113, an Inverse Fast Fourier Transform (IFFT) processing unit 114 and a digital-to-analog converter (DAC) 115.

The scrambler 111 randomizes data to be transmitted.

The FEC encoder 112 detects errors that occurs in a reception device and performs encoding on OFDM data to collect the detected errors. Specifically, the FEC encoder 112 performs encoding including convolutional encoding and Reed-Solomon (RS) encoding.

The mapper 113 maps the coded OFDM data using a symbol constellation, such as Quadrature Phase Shift Keying (QPSK), 16-Quadrature Amplitude Modulation (QAM) or 64-QAM. In the case of general DVB-T transmission systems, the 64-QAM constellation is used. If a TV transmission mode is activated in the DVB-T transmission system, the mapper 113 uses a symbol constellation in which inphase (I) and quadrature (Q) components of the OFDM symbols are regularly projected at coordinates of (−7, −5, −3, −1, 1, 3, 5, 7).

The IFFT processing unit 114 performs IFFT processing, so that frequency domain OFDM signals are converted into time domain OFDM signals. In more detail, the IFFT processing unit 114 allocates frequency domain OFDM signals comprising a plurality of pieces of parallel data to a plurality of sub-carriers, modulates the frequency domain OFDM signals and outputs time domain OFDM symbols.

The pilot insertion unit 120 generates pilot tone signals for the I and Q components of the OFDM signal, and transmits the generated pilot tone signals to the IFFT processing unit 114. Accordingly, the IFFT processing unit 114 may perform IFFT processing, so that the pilot tone signals may be disposed in each position within the OFDM symbols.

The DAC 115 performs digital-to-analog conversion on the OFDM symbols output from the IFFT processing unit 114, so that these OFDM symbols are transmitted to the reception device via the antenna.

Although not shown in FIG. 2, the OFDM transmission processing unit 110 may further include a guard interval (GI) insertion unit which inserts GIs into the leading end of each OFDM symbol, a synchronization information insertion unit which inserts timing synchronization signals and Pseudo-random Noise (PN) sequences into the front of the GIs, a filter unit which filters the OFDM symbols into which the PN sequences are inserted so that the OFDM symbols display predetermined waveforms, and a radio frequency (RF) processing unit which transmits the filtered OFDM symbols via wireless channels. As described above, the configuration of the OFDM transmission processing unit 110 may differ among various exemplary embodiments of the present invention.

The storage unit 140 stores a plurality of pilot insertion patterns. The OFDM transmission device according to the exemplary embodiment of the present invention shares the pilot insertion patterns with an OFDM reception device (not shown). Each of the plurality of pilot insertion patterns may be stored matching the type of communication environment. For example, if a communication environment where a data transmission rate is important is established, a pilot insertion pattern in which pilot tones are inserted into only some OFDM symbols may be used. Alternatively, if a communication environment which requires stable data reception is formed, for example, a dynamic communication environment, a pilot insertion pattern, in which pilot tones are individually inserted into each of the OFDM symbols, may be used.

The control unit 130 selects one from among the plurality of pilot insertion patterns stored in the storage unit 140, and controls the pilot insertion unit 120 to insert pilot tones into OFDM symbols in accordance with the selected pilot insertion pattern.

In more detail, the control unit 130 may receive information regarding the communication environment from the input unit 150. In response to a transmitter selection signal input by the input unit 150, the control unit 130 may select one from among the plurality of pilot insertion patterns. Alternatively, the input unit 150 may be implemented as an interface capable of receiving information or request regarding the communication environment from the OFDM reception device. In this situation, the control unit 130 may select a pilot insertion pattern in response to the request by the OFDM reception device through the input unit 150.

The plurality of pilot insertion patterns stored in the storage unit 140 generally comply with the DVB-T standard. Accordingly, each pilot tone is inserted on a single OFDM symbol in a predetermined period, for example every twelfth tone. In this situation, a pilot tone on a current OFDM symbol is spaced apart from a pilot tone on a previous OFDM symbol by two tones. In order to increase the data transmission rate, a pilot insertion pattern may be designed in which pilot insertion is skipped with respect to only some OFDM symbols. In this situation, pilot tones are inserted in a preset position of remaining OFDM symbols, so the OFDM transmission device according to the present exemplary embodiment may perform pilot insertion and pilot detection in the conventional DVB-T transmission system without change.

FIGS. 3 to 6 exemplarily show various pilot insertion patterns, and show only some of the plurality of OFDM symbols which are continuously transmitted. In FIGS. 3 to 6, a horizontal axis indicates a frequency, so a single line on the horizontal axis represents a single OFDM symbol; and a vertical axis indicates time, so the plurality of OFDM symbols may be transmitted in sequence as time passes. Additionally, white positions indicate data tones, and black tones indicate pilot tones that are inserted into OFDM symbols. In order to facilitate understanding of the present invention, OFDM symbols shown in FIGS. 3 to 6 are referred to as symbol 1, symbol 2, symbol 3, . . . , and symbol n, sequentially from top to bottom. Furthermore, the leftmost position of a single OFDM symbol is referred to as position Kmin, and the rightmost position is referred to as position Kmax. While both positions Kmin and Kmax contain pilot tones as shown in FIGS. 3 to 6, there is no limitation thereto.

FIG. 3 shows a pilot insertion pattern, in which pilot tones are inserted into only one OFDM symbol and pilot insertion is skipped with respect to two OFDM symbols among every three OFDM symbols, and which is hereinbelow referred to as a first pilot insertion pattern. Here, pilot tones are inserted into position Kmax and position Kmin at all times.

As shown in the first pilot insertion pattern of FIG. 3, a second pilot tone is inserted into the twelfth position from position Kmin on the first OFDM symbol (namely, symbol 1), and a third pilot tone is inserted into the twelfth position from the second pilot tone. Accordingly, pilot tones may be inserted into every twelfth position on a single OFDM symbol.

According to the first pilot insertion pattern of FIG. 3, pilot tones are not inserted into a second symbol and a third symbol, namely symbol 2 and symbol 3, excluding positions Kmin and Kmax, and pilot tones are inserted into a fourth symbol. On the fourth symbol, a second pilot tone is inserted into a ninth position from position Kmin. For example, if a pilot tone is inserted into a third position from position Kmin on the second symbol and if a pilot tone is inserted into a sixth position from position Kmin on the third symbol, a pilot tone may be inserted into the ninth position from position Kmin on the fourth symbol without change. Accordingly, it is possible to achieve compatibility with a conventional DVB-T system. Pilot tones are inserted into other OFDM symbols in the same manner as described above.

FIG. 4 shows a pilot insertion pattern in which pilot tones are inserted into two OFDM symbols among every three OFDM symbols, and more particularly, in which pilot tones are not inserted into positions, excluding positions Kmin and Kmax, on a third, sixth, ninth, . . . , 3N-th OFDM symbols. This pilot insertion pattern is hereinbelow referred to as a second pilot insertion pattern.

FIG. 5 shows a pilot insertion pattern in which pilot tones are inserted into four OFDM symbols among every five OFDM symbols, and more particularly, in which pilot tones are not inserted into positions, excluding positions Kmin and Kmax, on a first, sixth, eleventh, . . . , (5N−4)-th OFDM symbols. This pilot insertion pattern is hereinbelow referred to as a third pilot insertion pattern.

FIG. 6 shows a pilot insertion pattern in which pilot tones are inserted into all OFDM symbols. Each of pilot tones inserted into a certain symbol is placed rightward by three tones from each of pilot tones inserted into a previous symbol. The pilot insertion pattern shown in FIG. 6 may be employed in a dynamic communication environment, and hereinafter, is referred to as a fourth pilot insertion pattern.

Pilot tones that are not inserted into OFDM symbols in the pilot insertion patterns shown in FIGS. 3 to 6 are used as data tones. Comparing each of the pilot insertion patterns, the position of pilot tones inserted into OFDM symbols remains unchanged on the time axis, except that pilot tones are not inserted into some OFDM symbols. These pilot insertion patterns comply with a conventional DVB-T standard, so it is possible for the system according to the exemplary embodiment to have compatibility with a conventional DVB-T system.

Kmax in the pilot insertion patterns shown in FIGS. 3 to 6 is 1704 under a 2K FFT mode set using the DVB-T standard, so 1704 tone signals may form a single symbol. Additionally, Kmax in the pilot insertion patterns shown in FIGS. 3 to 6 is 6816 under a 8K FFT mode set using the DVB-T standard, so 6816 tone signals may form a single symbol. If pilot tones are inserted in the same manner as the fourth pilot insertion pattern, 142 tones of the 1704 tones are used as pilot tones under the 2K FFT mode, and 568 tones of the 6816 tones are used as pilot tones under the 8K FFT mode. This corresponds to 8.3% of the total data transmission rate. Accordingly, one of the first to third pilot insertion patterns may be selectively used to reduce the ratio of pilot tones to total tones, so it is possible to increase the data transmission rate.

The control unit 130 selects one from among the first to fourth pilot insertion patterns according to the communication environment, and controls the pilot insertion unit 120 to insert pilot tones into OFDM symbols in the selected pattern. For example, the control unit 130 may select the fourth pilot insertion pattern matching the dynamic communication environment. Alternatively, if HD grade broadcasting data is transmitted to a fixed reception device, the control unit 130 may select the first pilot insertion pattern. Additionally, it is possible for the control unit 130 to select one from among the first to fourth pilot insertion patterns, taking into consideration the amount of data to be transmitted or the stability, and to adopt the selected pattern.

As described above, the pilot insertion patterns may be selected in response to the transmitter selection signal or the request by the receiver input by the input unit 150.

The control unit 130 needs to notify the OFDM reception device of which pilot insertion pattern has been used, so that the OFDM reception device may exactly detect pilot tones inserted in the used pilot insertion pattern and may use the detected pilot tones for channel equalization and estimation. Accordingly, the control unit 130 may record pilot insertion pattern information on some data tones in each of the plurality of OFDM symbols, and may transmit the information. Alternatively, the control unit 130 may record pilot insertion pattern information on at least part of data tones used in part of the OFDM symbols, and may transmit the information. The pilot insertion pattern information may be represented by one bit or two bits. For example, 01, 10, 11 and 00 are used as information to designate the first to fourth pilot insertion patterns, respectively.

FIG. 7 is a flowchart explaining an OFDM transmission method according to an exemplary embodiment of the present invention. The OFDM transmission device generates a plurality of OFDM symbols (S710). A process for generating OFDM symbols has been well known to those skilled in the art, so detailed description thereof is omitted.

The OFDM transmission device selects a pilot insertion pattern (S720). The pilot insertion pattern may be selected according to the type of communication environment. In more detail, the OFDM transmission device may select a pilot insertion pattern according to whether the OFDM reception device is used in a dynamic or static communication environment, or according to whether there is a need to transmit high-capacity data. In this exemplary embodiment of the present invention, the OFDM transmission device may select a pilot insertion pattern from among the pilot insertion patterns shown in FIGS. 3 to 6.

Subsequently, the OFDM transmission device inserts pilot tones into the plurality of OFDM symbols in the selected pilot insertion pattern (S730). The plurality of OFDM symbols into which pilot tones are inserted according to the selected pilot insertion pattern are shown in FIGS. 3 to 6.

The OFDM transmission device sequentially transmits the plurality of OFDM symbols into which the pilot tones are inserted (S740). Accordingly, it is possible to provide OFDM broadcasting with the data transmission rate matching the communication environment.

FIG. 8 is a block diagram showing an OFDM reception device according to an exemplary embodiment of the present invention. The OFDM reception device of FIG. 8 includes a receiving unit 210, a pilot insertion pattern determination unit 220 and an OFDM reception processing unit 230.

The receiving unit 210 receives the plurality of OFDM symbols from an OFDM transmission device. The plurality of received OFDM symbols contain pilot tones inserted thereinto based on a change in pilot insertion patterns selected according to the type of communication environment, so the data transmission rate is variable. Here, the OFDM transmission device may have the configuration shown in FIG. 1 or 2.

The pilot insertion pattern determination unit 220 detects the pilot insertion pattern information from the plurality of received OFDM symbols. The pilot insertion pattern information is used to notify which pilot insertion pattern has been used, so the pilot insertion pattern determination unit 220 may determine the type of pilot insertion pattern using the detected information. One among the pilot insertion patterns shown in FIGS. 3 to 6 may be applied to the OFDM symbols, and pilot insertion patterns having other forms may also be used. Each of the pilot insertion patterns may be designed in such a manner that pilot tones are not inserted into a predetermined number of OFDM symbols in regular periods on the time axis while arrangement of pilot tones are maintained on the frequency axis. Therefore, pilot insertion and pilot detection processes may be performed in the same manner as the conventional DVB-T system.

The OFDM reception processing unit 230 detects pilot tones from the OFDM symbols based on the determined pilot insertion pattern, and processes the plurality of OFDM symbols. The configuration of the OFDM reception processing unit 230 will be described in detail with reference to FIG. 9.

FIG. 9 is a detailed block diagram showing the OFDM reception device of FIG. 8. The OFDM reception device shown in FIG. 9 further includes a storage unit 240 in addition to the receiving unit 210, pilot insertion pattern determination unit 220 and OFDM reception processing unit 230.

The receiving unit 210 includes an analog-to-digital converter (ADC) 211, a down converter 212 and an FFT processing unit 213. The receiving unit 210 receives the plurality of OFDM symbols from the OFDM transmission device.

The ADC 211 converts analog data received via an antenna into digital data, and outputs the converted digital data.

The down converter 212 down-converts the digital data output from the ADC 211 to a baseband signal.

The FFT processing unit 213 performs FFT processing on the down-converted signal, and outputs frequency domain OFDM symbols.

The pilot insertion pattern determination unit 220 detects pilot insertion pattern information from data tones contained in the OFDM symbols output from the FFT processing unit 213, and determines which pilot insertion pattern is applied to the currently received OFDM symbol. Specifically, the pilot insertion pattern corresponding to the detected information may be selected from the storage unit 240.

The storage unit 240 stores a plurality of pilot insertion patterns that have been previously set between the OFDM reception device and OFDM transmission device. In more detail, the storage unit 240 may store the pilot insertion patterns shown in FIGS. 3 to 6, so it is possible to implement the same configuration as the conventional DVB-T standard having compatibility with the conventional DVB-T standard.

The pilot insertion pattern determination unit 220 sends the determined pilot insertion pattern to the OFDM reception processing unit 230.

The OFDM reception processing unit 230 includes an equalizer 231 and an FEC decoder 232. The OFDM reception processing unit 230 processes each of the plurality of OFDM symbols.

If the pilot insertion pattern is provided by the pilot insertion pattern determination unit 220, the equalizer 231 detects pilot tones from the plurality of OFDM symbols, and equalizes the OFDM symbols using the detected pilot tones.

The FEC decoder 232 performs forward error correction processing on the equalized OFDM symbols. The receiving unit 210 and OFDM reception processing unit 230 may be configured in the same manner as known to those skilled in the art, so no further detailed description thereof is provided.

FIG. 10 is a flowchart explaining an OFDM reception method according to an exemplary embodiment of the present invention. In FIG. 10, when the plurality of OFDM symbols are received from the OFDM transmission device (S1010), the OFDM reception device determines the position of pilot tones, namely, the pilot insertion patterns, using the pilot insertion pattern information identified by certain data tones in the OFDM symbol (S1020).

Accordingly, the OFDM reception device detects the pilot tones according to the determined pilot insertion pattern, and performs equalization processing on the OFDM symbols using the detected pilot tones (S1030).

Here, the pilot insertion pattern may be selected adaptively corresponding to an environment in which the OFDM reception device receives the OFDM symbols. For example, if the OFDM reception device is able to move in the dynamic communication environment, a pilot insertion pattern in which pilot tones are inserted into each of the plurality of the OFDM symbols, namely the fourth pilot insertion pattern shown in FIG. 6, may be used. Alternatively, taking into consideration the data transmission rate, one of the first to third pilot insertion patterns may be optionally selected. Additionally, the OFDM reception device may transmit communication environment information to the OFDM transmission device, or the communication environment information may be transferred to the OFDM transmission device by various ways.

Various pilot insertion patterns other than the pilot insertion patterns shown in FIGS. 3 to 6 may be used, for example, pilot insertion patterns shown in FIGS. 11 and 12.

Referring to FIG. 11, the OFDM transmission device may select a pilot insertion pattern by adjusting the pilot insertion period n and the distance m between a pilot insertion position in a current OFDM symbol and a pilot insertion position in a previous OFDM symbol. In other words, while n is 12 and m is 3 in the pilot insertion patterns shown in FIGS. 3 to 6, either or both n and m may be adjusted so that the pilot insertion pattern may also be adjusted.

For example, if it is necessary to increase the data transmission rate, that is, if a static communication environment is formed, the pilot insertion unit 120 of the OFDM transmission device may set n or m to be greater.

FIG. 11 shows a pilot insertion pattern when n is set to 24 and m is set to 4. In this situation, the number of pilot tones may be extremely reduced even when pilot tones are inserted into all of the OFDM symbols, so the data transmission rate may increase.

The control unit 130 may select a pilot insertion pattern in such a manner of adjusting n and m to correspond to the communication environment. For example, if a dynamic communication environment is formed, the control unit 130 may select a first pilot insertion pattern in which n is set to 6 and m is set to 2. Additionally, if a dynamic communication environment having low mobility is formed, the control unit 130 may select a second pilot insertion pattern in which n is set to 12 or 16 and m is set to 3 or 4, so it is possible to ensure both the data transmission rate and stability. Furthermore, if a static communication environment without having mobility is formed, the control unit 130 may select a third pilot insertion pattern in which n is set to 24 and m is set to 4, as shown in FIG. 11. Accordingly, it is possible to adjust the data transmission rate while pilot tones being inserted into all of the OFDM symbols on the time axis, differently from the pilot insertion patterns shown in FIGS. 3 to 6.

Additionally, it is possible to adjust n and m while pilot tones are not inserted into part of OFDM symbols, so as to adjust the data transmission rate. FIG. 12 shows a pilot insertion pattern according to such an exemplary embodiment.

In the pilot insertion pattern shown in FIG. 12, n is set to 24 and m is set to 6, and pilot insertion is skipped every third OFDM symbol. Alternatively, pilot insertion may be skipped according to use and design environment of the OFDM transmission and reception system. Additionally, n and m remain unchanged in a currently used system environment, taking into consideration the pilot insertion period and position difference, so the OFDM transmission and reception system may have compatibility with the conventional system. For example, if n is set to 20 and m is set to 5 in the conventional system, the OFDM transmission and reception system of the present invention may change the data transmission rate without any change in n and m, while pilot tones being inserted into only some OFDM symbols.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A transmitting apparatus, the transmitting apparatus comprising:
   a processor configured to:
      identify a first pilot insertion pattern from among a plurality of pilot insertion patterns, and
      insert pilot tones into at least one of a plurality of orthogonal frequency division multiplexing (OFDM) symbols based on the first pilot insertion pattern; and
   a transmitter configured to transmit a signal which is generated based on the plurality of OFDM symbols, wherein the signal comprises information about the first pilot insertion pattern, wherein a distance between a first insertion position of a first pilot in a first OFDM symbol and a second insertion position of the first pilot in a second OFDM symbol is six tones in the first pilot insertion pattern, wherein a distance between the first insertion position of the first pilot and a third insertion position of the first pilot is twelve tones in the first OFDM symbol in the first pilot insertion pattern, and wherein the first pilot is not inserted in at least one OFDM symbol between the first OFDM symbol and the second OFDM symbol in the first pilot insertion pattern.

2. The transmitting apparatus as claimed in claim 1, wherein the processor is further configured to identify the first pilot insertion pattern based on whether a reception device is a mobile device or a fixed device.

3. The transmitting apparatus as claimed in claim 1, wherein the processor is further configured to identify the first pilot insertion pattern based on whether a broadcast data for high definition (HD) or a broadcast data for standard definition (SD) is being transmitted.

4. The transmitting apparatus as claimed in claim 1, wherein the processor is further configured to insert a guard interval (GI) into at least one of the plurality of OFDM symbols.

* * * * *